Aug. 25, 1925. 1,551,461
R. L. BLOOMINGDALE
AUTOMOBILE HEADLIGHT
Filed May 20, 1924
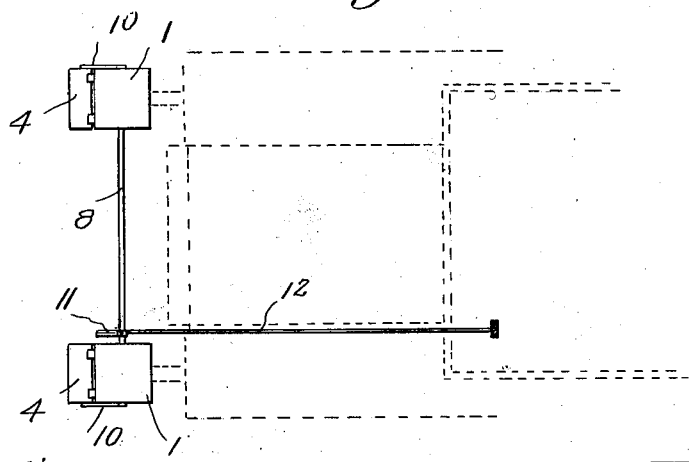
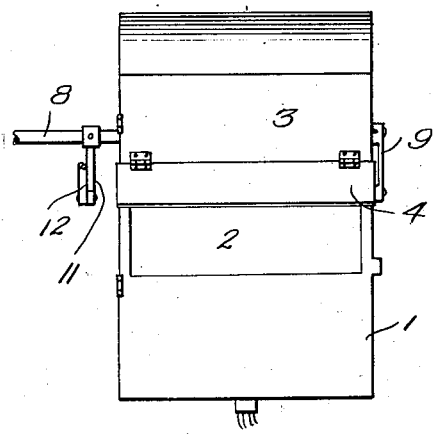
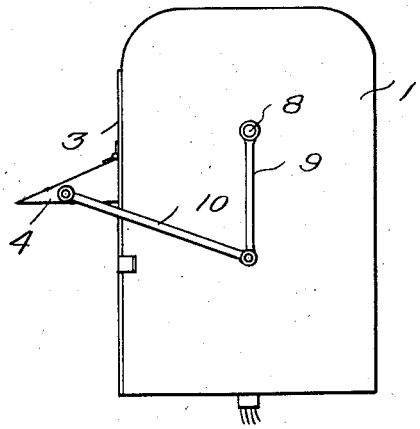
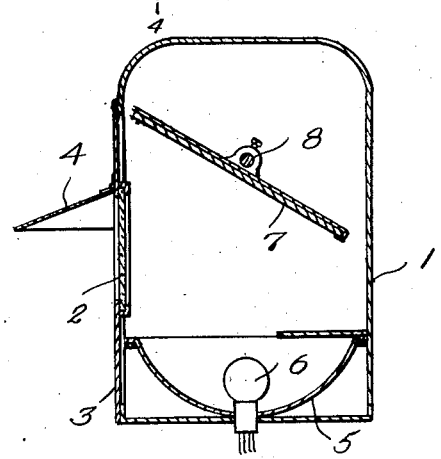
Robert L Bloomingdale
INVENTOR
BY Victor J. Evans
ATTORNEY Patented Aug. 25, 1925.

1,551,461

UNITED STATES PATENT OFFICE.

ROBERT L. BLOOMINGDALE, OF DECATUR, ILLINOIS.

AUTOMOBILE HEADLIGHT.

Application filed May 20, 1924. Serial No. 714,700.

*To all whom it may concern:*

Be it known that I, ROBERT L. BLOOMINGDALE, a citizen of the United States, residing at Decatur, in the county of Macon and State of Illinois, have invented new and useful Improvements in Automobile Headlights, of which the following is a specification.

This invention relates to an automobile headlight and has for its primary object the construction of a headlight the rays of light of which may be controlled from the seat of the automobile. An object of the invention is the construction of mechanism whereby the direction of travel of light rays may be changed at will.

The feature of my invention is the combination of a movable shade acting in unison with means for controlling the direction of travel of the light rays.

With the above and other objects in view the invention consists in the novel features of construction, the combination and arrangement of parts here and after more fully set forth pointed out in the claim and shown in the accompanying drawing.

Fig. 1 is a top plan view of my automobile headlight construction.

Fig. 2 is a front elevation of the headlight.

Fig. 3 is a side elevation.

Fig. 4 is a vertical sectional view on the line 4—4 Fig. 2.

Again referring to the drawing illustrating one embodiment of my invention the numeral 1 designates a casing having a lens 2 in its front wall. In this particular construction a door 3 forms the front wall of the casing. Hinged to the door 3 is a shade 4 associated with the lens 2 so as to control the light effect of the lens. Arranged in the bottom of the casing is a stationary reflector 5 associated with the electric bulb 6. A movable reflector 7 is mounted on a shaft 8 and properly positioned above reflector 5 as to properly reflect the light rays through lens 2. The shaft 8 has an arm 9 connected by a link 10 to the shade 4. Shaft 8 has a second arm 11 connected to a controlling rod 12 that extends to the front seat of the automobile.

From the fore-going description taken in connection with the accompanying drawing, it will be apparent that the operator by moving rod 12 can change the position of reflector 7 and shade 4 for controlling the light ray passing through lens 2. Thus it will be seen that I provide a headlight that will meet all the requirements of safe driving. It is, of course, to be understood that the exact construction of the various parts and the arrangement thereof may be changed at will without departing from the spirit of the invention and therefore, I do not desire to be limited in any manner except as set forth in the following claim.

Having thus described my invention what I claim is:—

An automobile headlight comprising a casing, a lens arranged in front of said casing, a stationary reflector at the bottom of the casing, an electric bulb associated with said reflector, a movable reflector positioned within the casing above the lens, a movable shade hinged to the exterior of the casing above the lens, a shaft to which said movable reflector is adjustably attached, a link connection between said shade and shaft, an arm projecting from the shaft and a control rod connecting said arm for simultaneously operating said movable reflector and shade.

In testimony whereof I affix my signature.

ROBERT L. BLOOMINGDALE.